United States Patent [19]

Yonekura et al.

[11] Patent Number: 4,531,625
[45] Date of Patent: Jul. 30, 1985

[54] CIRCULAR OBJECT'S DIAMETER DETERMINING DEVICE

[75] Inventors: Kenichi Yonekura; Kazuto Asami; Yushi Hino; Katsumi Yagi, all of Himeji, Japan

[73] Assignee: Glory Kogyo Kabushiki Kaisha, Japan

[21] Appl. No.: 460,726

[22] Filed: Jan. 25, 1983

[30] Foreign Application Priority Data

Jan. 30, 1982 [JP] Japan .................................. 57-13934

[51] Int. Cl.³ .............................................. G07D 5/02
[52] U.S. Cl. .................................. 194/102; 133/3 R; 356/386
[58] Field of Search ................. 194/99, 102; 133/3 R, 133/3 A, 3 B, 3 C, 3 D, 3 E, 3 F, 3 G, 3 H; 356/384, 385, 386

[56] References Cited

U.S. PATENT DOCUMENTS 3,947,129  3/1976  Wiklund .............................. 356/385
4,249,648  2/1981  Meyer ................................. 194/102

FOREIGN PATENT DOCUMENTS 1379473  1/1975  United Kingdom .

Primary Examiner—F. J. Bartuska
Attorney, Agent, or Firm—Beveridge, DeGrandi & Weilacher

[57] ABSTRACT

A device for determining the diameters of circular objects such as coins is made up of a pair of photo-electric converters which are extended from both sides of a coin passageway towards the central line of the latter, a pair of light-shielded portion area measuring circuits for producing signals representing the areas of the portions of the converters which are shielded from light by a circular object according to the outputs of the converters, an adder for providing the sum of the outputs of the two light-shielded portion area measuring circuits, a maximum value memory circuit for storing the maximum of the outputs of the adder which are provided during passage of one circular object through the converters, and a circuit for determining the diameter of the circular object according to the data stored in the maximum value memory circuit.

4 Claims, 4 Drawing Figures

PASSAGEWAY BOTTOM PLATE

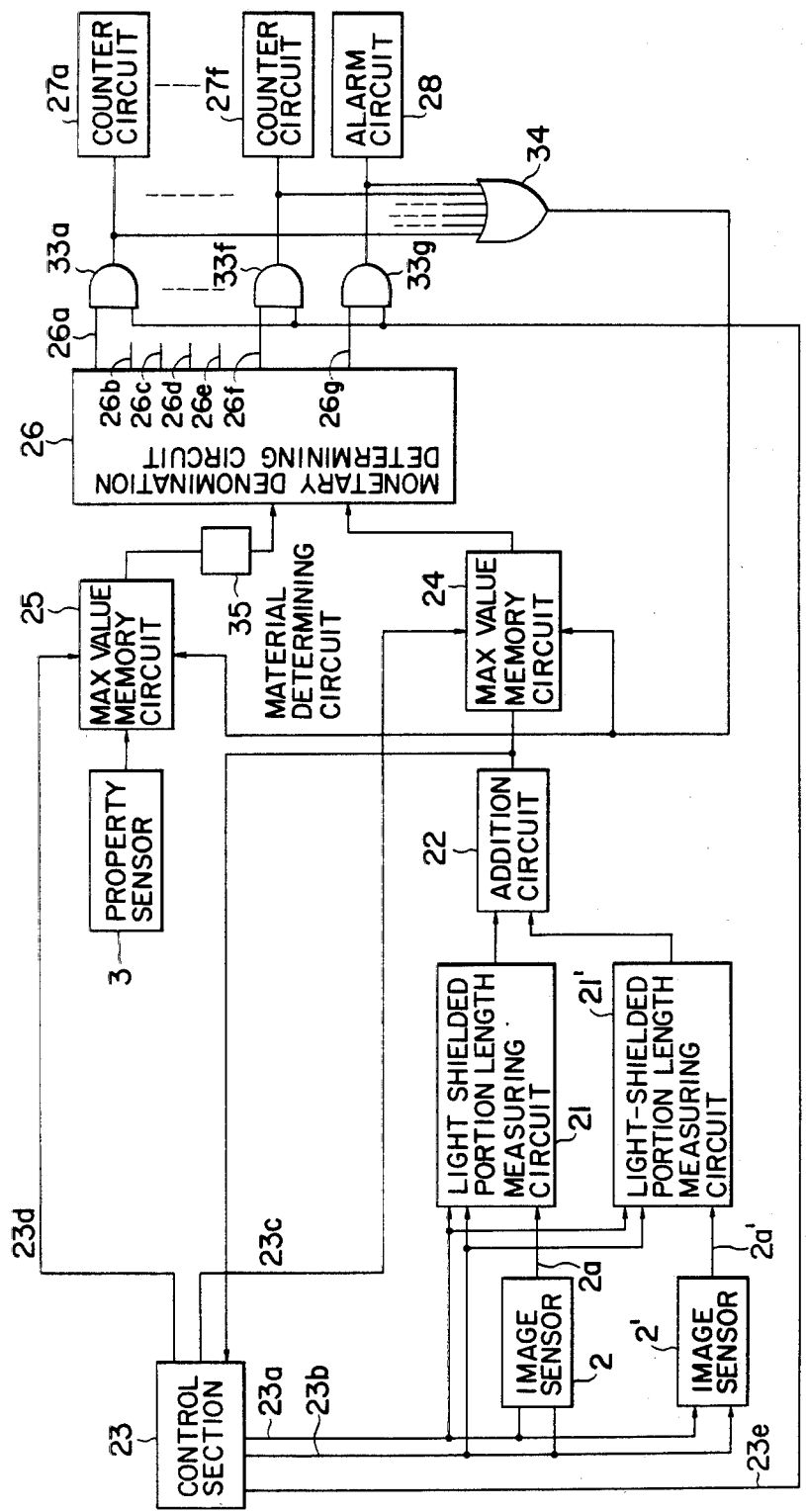
F I G. 3

CIRCULAR OBJECT'S DIAMETER DETERMINING DEVICE

BACKGROUND OF THE INVENTION

This invention relates to a device for determining the diameters of circular objects such as coins.

In order to classify circular objects according to their diameters, it is necessary to determine the diameters. For instance, when it is required to classify coins different in monetary denomination and different in diameter, it is necessary to measure the diameters. In a coin sorting machine for sorting out a number of coins by means of coin sorting holes different in diameter which are provided separately according to the monetary denominations, a diameter determining device is known in the art in which counting coins separately according to the monetary denominations is carried out by optically determining the diameters of coins at a coin passageway which is located before the first coin sorting hole (the counting operation being not carried out near the respective coin sorting holes). More specifically, in the diameter determining device, a light source and a photo-electric converter are disposed on both sides of the passageway, respectively, so that the diameter of a coin is determined from the amount of light which is shielded by the coin when the latter reaches the detection position. However, with the device, it is necessary to use a position detecting sensor in order to accurately detect when the coin reaches the detection position. In this case, it is required in conveying coins that the coins are moved along one side of the passageway by using a roller or the like, and accordingly the conveying mechanism is unavoidably intricate.

SUMMARY OF THE INVENTION

Accordingly, an object of this invention is to provide a device which can accurately determine the diameters of circular objects such as coins without causing the circular objects to run along one side of the passageway.

The foregoing object and other objects of the invention have been achieved by the provision of a device for determining circular objects' diameters which comprises: according to the invention, a pair of photo-electric converters which are protruded from both sides of a passageway, on which circular objects are conveyed, towards the central line of the passageway, each photo-electric converter producing a signal according to the area of a portion thereof which is shielded from light by a circular object; a pair of light-shielded portion area measuring circuits for receiving the outputs of the photo-electric converters, to provide signals representing the areas of portions thereof which are shielded from light by a circular object, respectively; an addition circuit for obtaining the sum of the outputs of the pair of light-shielded portion area measuring circuits; a maximum value memory circuit for receiving the output of the addition circuit, to store the maximum of the outputs of the addition circuit which are provided while one circular object passes through the photo-electric converters; and a determining circuit for determing the diameter of a circular object according to data stored in the maximum value memory circuit.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIG. 3 is a block diagram showing a diameter determining device and its relevant circuits according to one embodiment of this invention.

DETAILED DESCRIPTION OF THE PREFERRED EMBODIMENT

One preferred embodiment of this invention, in which the circular objects are coins and a one-dimensional image sensor is employed as a photo-electric conversion element array, will be described with reference to the accompanying drawings.

Figure 1:
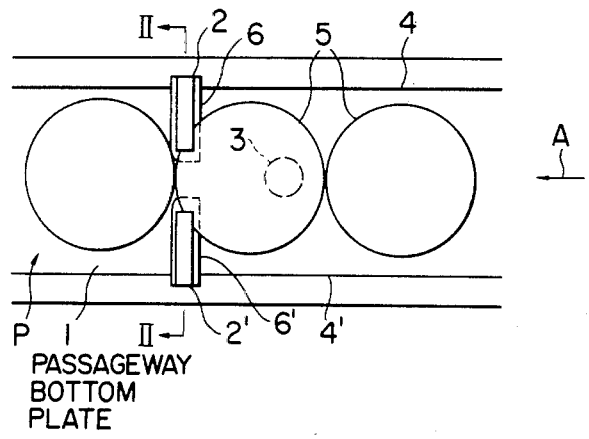
FIG. 1 is a plan view showing a passageway on which circular objects are conveyed, and image sensors disposed on the passageway.
Figure 2:
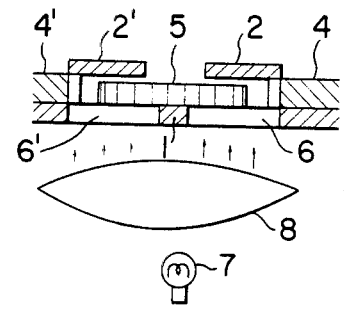
FIG. 2 is a sectional view taken along line II—II in FIG. 1.

In FIGS. 1 and 2, reference numeral 1 designates a passageway bottom plate; and 4 and 4', passageway side walls, the bottom plate 1 and the side walls 4 and 4' forming a passage P. Coins 5 are continuously conveyed by a conveying belt or the like to the passageway P in the direction of the arrow A.

The bottom plate 1 has holes 6 and 6'. A light source 7 such as a light bulb and a lens 8 are provided below the holes 6 and 6'. A pair of image sensors 2 and 2' are arranged above the hole 6 and 6' so as to receive light beams passed through the holes 6 and 6', respectively. The pair of image sensors 2 and 2' are mounted on a frame (not shown) above the passageway P, and are arranged in such a manner that they are extended from outside of the side walls 4 and 4' towards the central line of the passage-way P and are in one line which is perpendicular to the coin conveyance direction A. It should be noted that the image sensors 2 and 2' are so positioned that they are not confronted with the central portion of each coin. This is to prevent, when a coin having a central hole such as a 5-yen coin or 50-yen coin passes, the image sensors 2 and 2' from receiving a light beam passed through the central hole of the coin. Each of the image sensors 2 and 2' is an array of 512 photo-diodes arranged in a straight line. According to the amounts of light received by the photo-diodes, electrical signals are outputted. More specifically, the photo-diodes outputs "L" level signals when they receive no light, and "H" level signals when they receive light. These signals are outputted in series in the order of scanning of the photo-diodes. Since the holes 6 and 6' are extended across the side walls 4 and 4' as illustrated in FIG. 1, a predetermined number (for instance four) of photodiodes on the outside of each side wall are never shielded from light by the coin, and accordingly they can provide the "H" level signals when scanned.

A material (magnetic characteristic) sensor 3 is disposed upstream of the image sensors 2 and 2' as shown in FIG. 1. The material sensor 3 has primary and secondary coils which are arranged adjacent to coins passing through the material sensor 3, and outputs a voltage signal which depends on the material of a coil in passage and the area of the coin with which confronts the primary and secondary coils. Even if coins are equal in material, the output voltage signal provided when the sensor 3 is covered completely by the coin as indicated by the broken line (3) in FIG. 1 is different from that provided when it is partially covered. Furthermore, in the case when the region indicated by the broken line (3) is covered entirely or partially by the central hole of a 5-yen or 50-yen coin, the output voltage signal is different.

Figure 4:
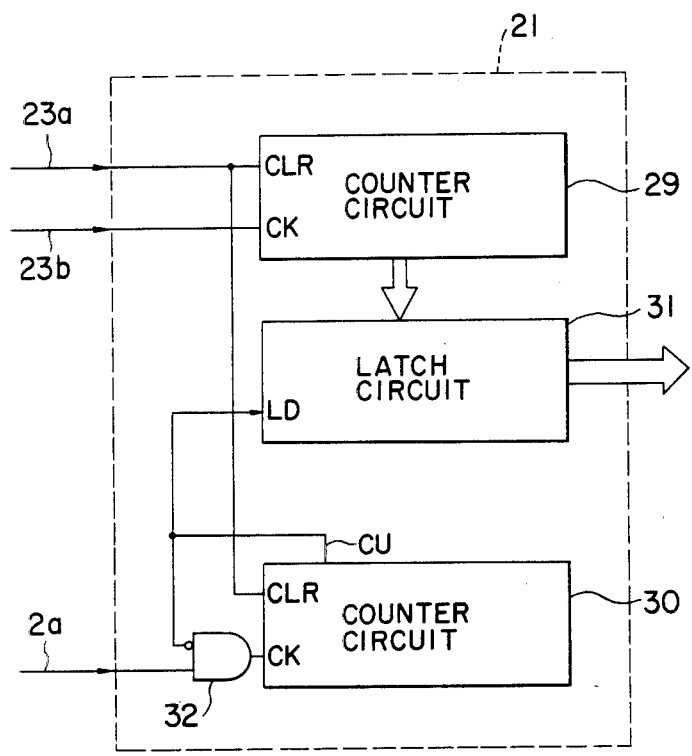
FIG. 4 is a block diagram of a light-shielded portion length measuring circuit in FIG. 3.

In FIG. 3, reference numerals 21 and 21' designate light-shielded portion length measuring circuits which, receiving output signals 2a and 2a' from the image sensors 2 and 2', output signals representative of the lengths of the portions of the image sensors 2 and 2' which are shielded from light by a coin. FIG. 4 shows the light-shielded portion length measuring circuit 21 in more detail, which is identical to the other circuit 21'.

In FIG. 4, a counter circuit 29 operates to count a clock signal 23b from a control section 23. A counter circuit 30 operates to count an "H" level signal from the image sensor 2, and to output a signal CU when the count value reaches a predetermined value (for instance four (4)). The signal CU is applied to the inhibition input terminal of an AND gate 32, to stop the application of the signal 2a from the image sensor 2 to the counter circuit 30. The signal CU is further applied, as a control input signal, to the LD terminal of a latch circuit 31. Upon reception of the signal CU, the latch circuit 31 stores the count value of the counter circuit 29 at that time. The output of the latch circuit 31 is the output of the light-shielded portion length measuring circuit 21. This output signal has a value which is the sum of the number of photo-diodes in the portion shielded from light and four (4). In principle, the ending of the light-shielded portion may be admitted when, in each scanning, the first "H" level signal is provided; however, in order to avoid the effect of noises or the like the ending of the light-shielded portion is admitted only when the "H" level signal is outputted a predetermined number of times (four times in the embodiment). Upon completion of one cycle of scanning, the counter circuits 29 and 30 and the latch circuit 31 are reset.

The light-shielded portion length measuring circuit 21' is equal in arrangement to the above-described circuit 21. However, it should be noted that, since a coin does not always pass between the image sensors 2 and 2', the output of the circuit 21' is not always equal to that of the circuit 21. However, when coins are equal in diameters, the sum of the outputs of circuits 21 and 21' provided when the coin passes below the image sensors 2 and 2' varies in accordance with the same pattern, and its maximum value is also the same.

Referring to FIG. 3, reference numeral 22 designates an addition circuit for subjecting the output signals of the light-shielded portion length measuring circuits 21 and 21' to addition, to output a signal corresponding to the sum of light-shielded portion lengths.

The control section 23 operates to apply control signals 23a and clock signals 23b to the image sensors 2 and 2' and the measuring circuits 21 and 21', so that the image sensors 2 and 2' are sequentially read, or scanned. The control section 23 further operates to control maximum value memory circuits 24 and 25 and a monetary denomination determining circuit 26 according to the output of the addition circuit 22. The control section 23 provides a control signal 23d for a period of time in which the output of the addition circuit 22 is increased from 20 to 100 or more, a control signal 23c for a period of time in which the output of the addition circuit 22 is further increased to 200 or more and is then decreased to 200, and a control signal 23e when the output of the addition circuit 22 is decreased to less than 200.

In the maximum value memory circuit 24, in response to the control signal 23c from the control section 23 the output of the addition circuit 22 is stored and is then compared with the previously stored one, and the larger of the two is stored again. With respect to one coin, the above-described comparison and storage are repeatedly carried out, as a result of which a value corresponding to the diameter of the coin is obtained.

In the maximum value memory circuit 25, in response to the control signal 23d from the control section 23 the output (detection level) of the material sensor 3 is stored and is then compared with the previously stored one, and the larger of the two is stored again. With respect to one coin, the above-described comparison and storage are repeatedly carried out, as a result of which a value obtained finally is outputted as one corresponding to the property of the coin.

A material determining circuit 35 determines the property of a coin in passage according to the value stored in the maximum value memory circuit 25, to output a signal representing a result of determination, i.e., a signal indicating the fact that the material of a coin in passage is aluminum, brass, copper, nickel or others.

The monetary denomination determining circuit 26 operates to read the outputs of the maximum value memory circuit 24 and the material determining circuit 35 and to determine the monetary denomination of the coin according to the outputs thus read. This determination is carried out as indicated in Table 1 below:

TABLE 1

| Output of circuit 24 | Output of circuit 35 | Determination by circuit 26 | "H" level output of circuit 26 |
|---|---|---|---|
| 704–724 | Aluminum | 1-yen | 26a |
| 740–760 | Nickel | 50-yen | 26b |
| 776–794 | Brass | 5-yen | 26c |
| 799–817 | Nickel | 100-yen | 26d |
| 829–849 | Copper | 10-yen | 26e |
| 936–956 | Nickel | 500-yen | 26f |
| None of the above combinations are applicable | | False coin | 26g |

For instance, when the output of the circuit 24 is 750 and the output of the circuit 35 indicates "nickel", then the coin is determined as a 50-yen coin. When the output of the circuit 24 is 750, and the output of the circuit 35 indicates "aluminum", then the coin is determined as a false coin. The determining circuit 26 outputs one of the signals 26a through 26g representative of the respective determination results.

AND gates 33a through 33g receive the control signal 23e from the control section 23 through first input terminals thereof, and the outputs 26a through 26g of the determining circuit 26 through the second input terminals thereof.

Counter circuits 27a through 27f receive the outputs of the AND gates 33a through 33f, to count the number of coins separately according to the monetary denominations, respectively.

An alarm circuit 28 receives the output of the AND gate 33g, to produce an alarm signal for reporting the passage of a false coin to the operator and to suspend the conveyance of coins.

Any one of the outputs of the AND gates 33a through 33g is applied through an OR gate 34 to the maximum value memory circuits 24 and 25 to reset the latter 24 and 25, so that the preparation for determination of the next coin can be completed.

The image sensors 2 and 2', the light-shielded portion length measuring circuits 21 and 21', the addition circuit 22, the control section 23 and the maximum value memory circuit 24 form a device for measuring coin diameters. However, as was described before, the apparatus shown in FIG. 3 operates not only to measure diameters but also to detect materials of coins, and to determine monetary denominations according to the diameters and materials thus detected and counts the numbers of coins separately according to the monetary denominations. For this purpose, the apparatus has the other members 3, 25, 26, 27a through 27f, 28, 33a through 33g, 34 and 35.

In operation, the image sensors 2 and 2', receiving the control signal 23a and the clock signal 23b from the control section 23, perform one scanning from their inner ends closer to the central line of the passageway towards their outer ends, thus outputting signals sequentially. On the other hand, the material sensor 3 repeatedly outputs the signals of voltages induced in the secondary coil thereof.

When the first (top) coin 5 conveyed starts passing through the material sensor 3, the output voltage of the latter 3 increases; however, at this time instant, it is not stored in the maximum value memory circuit 25.

Furthermore, at this time instant, none of the image sensors 2 and 2' are shielded from light by the coin 5. Therefore, when the scanning is advanced to the fourth photo-diode from the inner end, the count value of the counter circuit 30 comes to four (4), thus outputting the signal CU. At this time instant the count value (4) of the counter circuit 29 is stored by and outputted from the latch circuit 31. When the one scanning has been accomplished, the outputs of the two light-shielded portion length measuring circuits 21 and 21' are subjected to addition in the addition circuit 22. As a result, the output of the addition circuit 22 is eight (8). The output of the addition circuit 22 is applied to the control section 23, where it is determined to be smaller than a predetermined value "nineteen (19)". As a result, no control signal 23d is applied to the maximum value memory circuit 25, and accordingly the output signal of the material sensor 3 is not stored in the memory circuit 25. In addition, no control signal 23c is produced, and accordingly the output of the addition circuit 22 is not stored in the memory circuit 24. The above-described operations are repeatedly carried out until the image sensors 2 and 2' are covered by the coin 5.

When the coin 5 is moved to partially cover the image sensors 2 and 2', each of the outputs of the light-shielded portion length measuring circuits 21 and 21' is a value which is the sum of the number of photo-diodes in the light-shielded portion and the number "four (4)". As the coin 5 is advanced, the light-shielded portions are lengthened and the outputs of the circuits 21 and 21' are increased, thus causing the output of the addition circuit 22 to increase. When the output of the addition circuit 22 reaches twenty (20), the control section 23 provides the control signal 23d, so that the maximum value memory circuit 25 starts the operation that the output signal of the material sensor 3 is stored therein and compared with the previously stored one, and the larger of the two is stored again. When the output of the addition circuit 22 reaches 100, the production of the control signal 23d by the control section 23 is suspended, and therefore the comparison and storage operation of the maximum value memory circuit 25 is suspended. As a result, the maximum value of the output signals of the material sensors 3 which has been provided so far remains in the memory circuit 25. According to this maximum value, the material determining circuit 35 provides the signal representing the material.

When the coin 5 is further advanced to allow the output of the addition circuit 22 to come to 200 or more, the control section 23 produces the control signal 23c, so that the maximum value memory circuit 24 starts the operation that the output of the addition circuit 22 is stored in the maximum value memory circuit 24 and is compared with the previously stored one and the larger of the two is stored again. This operation is repeatedly carried out until the center of the coin passes through the image sensors 2 and 2', and, as a result, the output of the addition circuit 22 becomes smaller than 200. As is apparent from the above description, the maximum of the outputs of the addition circuit 22 provided for the period of time in which the output of the addition circuit 22 is increased to 200 or more and is then decreased to less than 200 is stored, as a signal representing the diameter of the coin, in the maximum value memory circuit 24.

When the output of the addition circuit 22 is decreased to less than 200 as described above, the control section 23 applies the control signal 23e to the AND gates 33a through 33g. The determining circuit 26 determines the denominations of coins at all times to output the signals 26a through 26g, respectively; on the other hand, any of the outputs 26a–26f of the determining circuit 26 provided when the control signal 23e is obtained is applied to the respective one of the counter circuits 27a through 27f through the respective one of the AND gates 33a through 33f and is counted thereby, and also the output 26g is applied to the alarm circuit 28 through the AND gate 33g to cause the latter 28 to produce the alarm signal and to stop the conveyance of coins.

The output of any one of the AND gates 33a through 33g is applied through the OR gate 34 to the maximum value memory circuits 24 and 25 to reset the latter circuits 24 and 25, so that the preparation for determining the diameter and material of the next coin can be completed.

Even if the following coin is conveyed in such a manner that it is in contact with the preceding coin, after the sum of the lengths of the light-shielded portions of the image sensors 2 and 2' which are shielded from light becomes sufficiently smaller, i.e., after the output of the addition circuit 22 becomes smaller than twenty (20), it becomes larger again, and thereafter the diameter and material of the coin is determined. Accordingly, coins can be correctly determined at all times.

If a method is employed in which length in the longitudinal direction of the passageway is obtained according to both the time interval which elapses from the time instant that shielding the image sensors from light is started until the shielding from light is ended, and the speed of conveyance at that time, then mixing of objects which are not circular, such as elliptic objects can be detected.

In the above-described embodiment, the one-dimensional image sensors are employed as the photoelectric converters to obtain the lengths of the portions shielded from light; however, two-dimensional image sensors may be employed to detect the areas of such portions. In the embodiment, the image sensors are employed; however, any devices can be employed as the photo-electric converter if they can output signals according to the lengths or areas of the portions shielded from light.

Furthermore, the control section 23 and the circuits 21, 21', 22, 24, 25, 35 and 26 may be replaced by a computer such as a microcomputer which is so programmed as to perform the above-described operations thereof.

As is apparent from the above description, according to the invention, the diameter of a coin is determined from the data which is provided when the area of the portion of each photo-electric converter, which is shielded from light, becomes maximum, and accordingly it is unnecessary to separately provide a position detecting sensor. Furthermore, since the diameter of a coin is determined from the sum of the outputs of a pair of photo-electric converters, it is unnecessary to strictly regulate the flow of circular objects. Accordingly, the conveying mechanism can be simple, and even if circular objects are conveyed in such a manner that they are in contact with one another, their diameters can be satisfactorily measured.

What is claimed is:

1. A device for determining the diameter of a circular object moving down a passageway, said device comprising:

a pair of photo-electric converters protruding from both sides of a passageway down which circular objects move, said converters protruding towards the central line of said passageway, for simultaneously scanning from the central line of the passageway toward both sides of the passageway and producing a signal corresponding to the area of the portion of said converters shielded from light by the circular object;

a pair of light-shielded portion area measuring circuits for receiving outputs of said photo-electric converters and providing signals representing the areas of the portions of said converters being shielded from light by the circular object;

an addition circuit for summing the outputs of said pair of light-shielded portion area measuring circuits and providing a signal representing the sum thereof;

a maximum value memory circuit receiving the output of said addition circuit for storing the maximum output of said addition circuit provided while one circular object passes through said photo-electric converters; and a determining circuit for determining the diameter of a circular object from the maximum output stored in said maximum value memory circuit.

2. A device as claimed in claim 1, in which said photo-electric converters are so positioned as to be away from the central line of said passageway.

3. A device as claimed in claim 1, in which said pair of photo-electric converters are a pair of photo-electric element arrays which are arranged in one line which is perpendicular to the central line of said passageway.

4. A device as claimed in claim 1, in which each photo-electric converter is an image sensor.

* * * * *